US011823427B2

(12) United States Patent
Shrotriya et al.

(10) Patent No.: US 11,823,427 B2
(45) Date of Patent: Nov. 21, 2023

(54) AUTOMATIC ARTWORK REVIEW AND VALIDATION

(71) Applicant: ACCENTURE GLOBAL SOLUTIONS LIMITED, Dublin (IE)

(72) Inventors: Shobhit Shrotriya, Bangalore (IN); Rajneesh Soni, Vihar (IN); Sanjib Ghosh, Bangalore (IN); Vinod Kumar, Bangalore (IN); Gandam Seema Moses, Bangalore (IN); Deepak Kumar Arjun, Chennai (IN); Partha Sarathy Paramanik, Bhubaneswar (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 386 days.

(21) Appl. No.: 17/357,365

(22) Filed: Jun. 24, 2021

(65) Prior Publication Data
US 2022/0414389 A1    Dec. 29, 2022

(51) Int. Cl.
| | | |
|---|---|---|
| *G06V 10/22* | (2022.01) | |
| *G06F 16/35* | (2019.01) | |
| *G06F 16/332* | (2019.01) | |
| *G06V 20/62* | (2022.01) | |

(52) U.S. Cl.
CPC .......... *G06V 10/22* (2022.01); *G06F 16/3329* (2019.01); *G06F 16/35* (2019.01); *G06V 20/62* (2022.01)

(58) Field of Classification Search
CPC ........ G06V 10/22; G06V 20/62; G06F 16/35; G06F 16/3329
See application file for complete search history.

(56) References Cited

U.S. PATENT DOCUMENTS

| | | | | |
|---|---|---|---|---|
| 9,911,034 B2* | 3/2018 | Chulinin | ............... | G06V 30/246 |
| 11,068,662 B2* | 7/2021 | Zorzin | ................. | G06F 40/232 |
| 2005/0240393 A1* | 10/2005 | Glosson | ................ | G06F 40/166 |
| | | | | 704/8 |
| 2015/0286643 A1* | 10/2015 | Kumar | ................ | G06F 16/9535 |
| | | | | 707/728 |
| 2016/0098611 A1* | 4/2016 | Gray | .................. | G06V 30/1452 |
| | | | | 382/229 |
| 2021/0124919 A1* | 4/2021 | Balakrishnan | .......... | G06F 21/64 |
| 2021/0182549 A1* | 6/2021 | Ustuntas | ............... | G06V 30/224 |

FOREIGN PATENT DOCUMENTS

WO    WO-2019122532 A1 *  6/2019  ........... G06F 40/216

\* cited by examiner

*Primary Examiner* — Shefali D Goradia
(74) *Attorney, Agent, or Firm* — Mannava & Kang, P.C.

(57) ABSTRACT

An automatic artwork review system validates an artwork or a product label based on a received label specification document. Text extracted from the product label is chunked into sentences and words. Character-wise comparison is executed to identify the best match text from the label specification document for the sentence chunks from the product label. If the corresponding best match texts bears a similarity higher than a predetermined threshold to selected text including one or more sentence chunks, no errors are raised. If the similarity of the best match text to the selected text is not higher than the predetermined threshold, the specific errors occurring in the selected text and the particular portions where such errors are present are identified. The information regarding the errors can be output via one or more of an output user interface or a label compliance report.

20 Claims, 12 Drawing Sheets

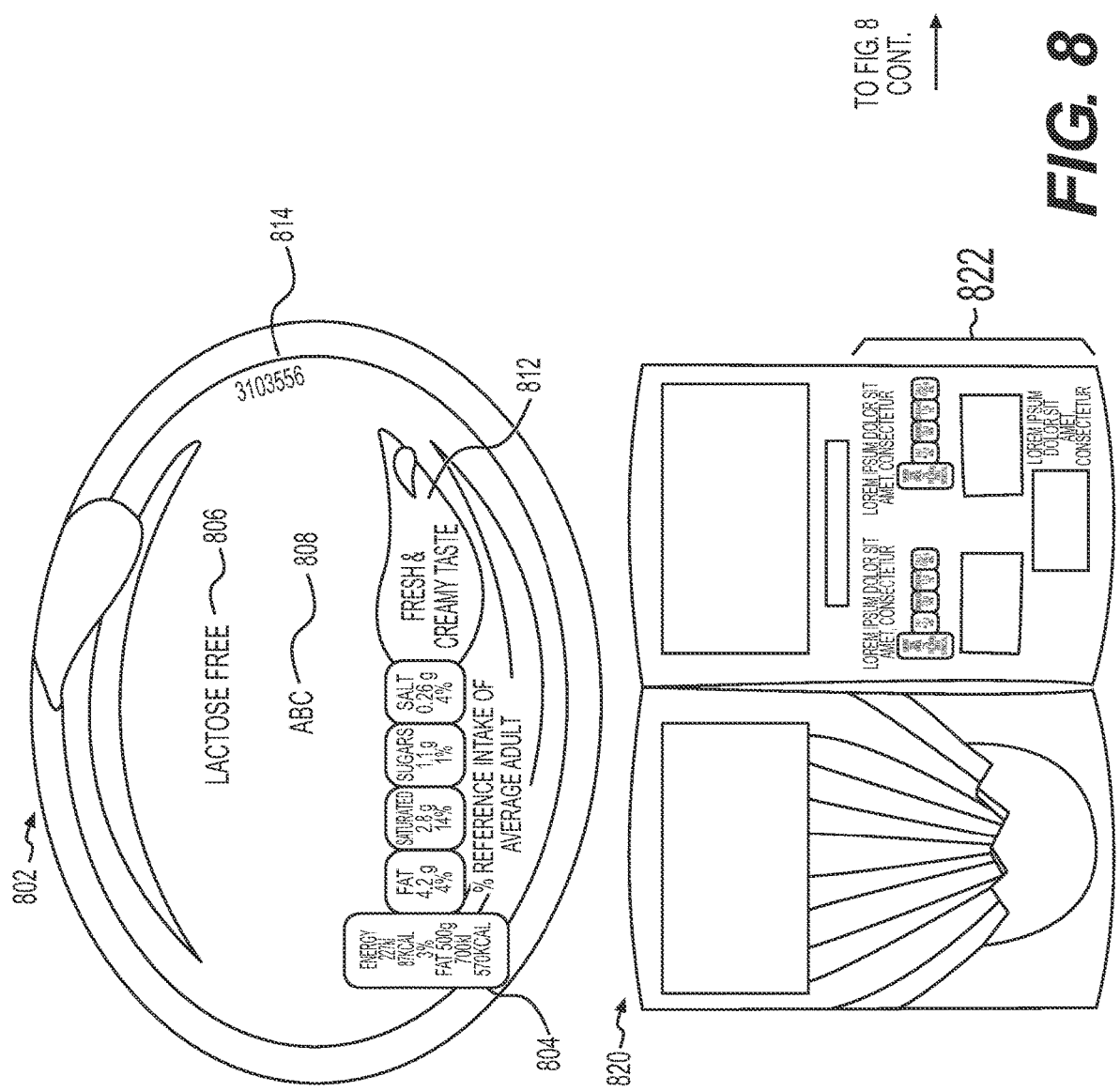

FIG. 10

AUTOMATIC ARTWORK REVIEW AND VALIDATION

BACKGROUND

A product artwork or a product label is a visual tool affixed to a product that delivers the product's details uniquely. While an ordinary-looking label may provide legal information about the product such as its date of manufacturing and ingredients used, manufacturers prefer to use product labels as marketing tools also. As a result, there is pressure to design the product labels to look attractive for marketing purposes while conveying the legal/regulatory information along with the marketing slogans, trademarks, icons, or other images. The text on the product labels is also designed to meet particular marketing and/or legal specifications to ensure that the product label includes particular brand colors, fonts, images, etc. which facilitate easy recognition of the product by consumers. Product labels are generally constrained by the size of the product. Hence, the textual and the image content needs to be designed in the appropriate style so that all the desired information is conveyed. A product label report or a label specification document includes specifications regarding the textual content to be conveyed on a product label and may be used to validate the product label. A product label may be validated against the label specification document to ensure that the product label meets the regulatory and marketing requirements.

BRIEF DESCRIPTION OF DRAWINGS

Features of the present disclosure are illustrated by way of examples shown in the following figures. In the following figures, like numerals indicate like elements, in which:

FIG. 10 shows an example output UI generated by the artwork review system in accordance with the examples disclosed herein.

DETAILED DESCRIPTION

Figure 1:
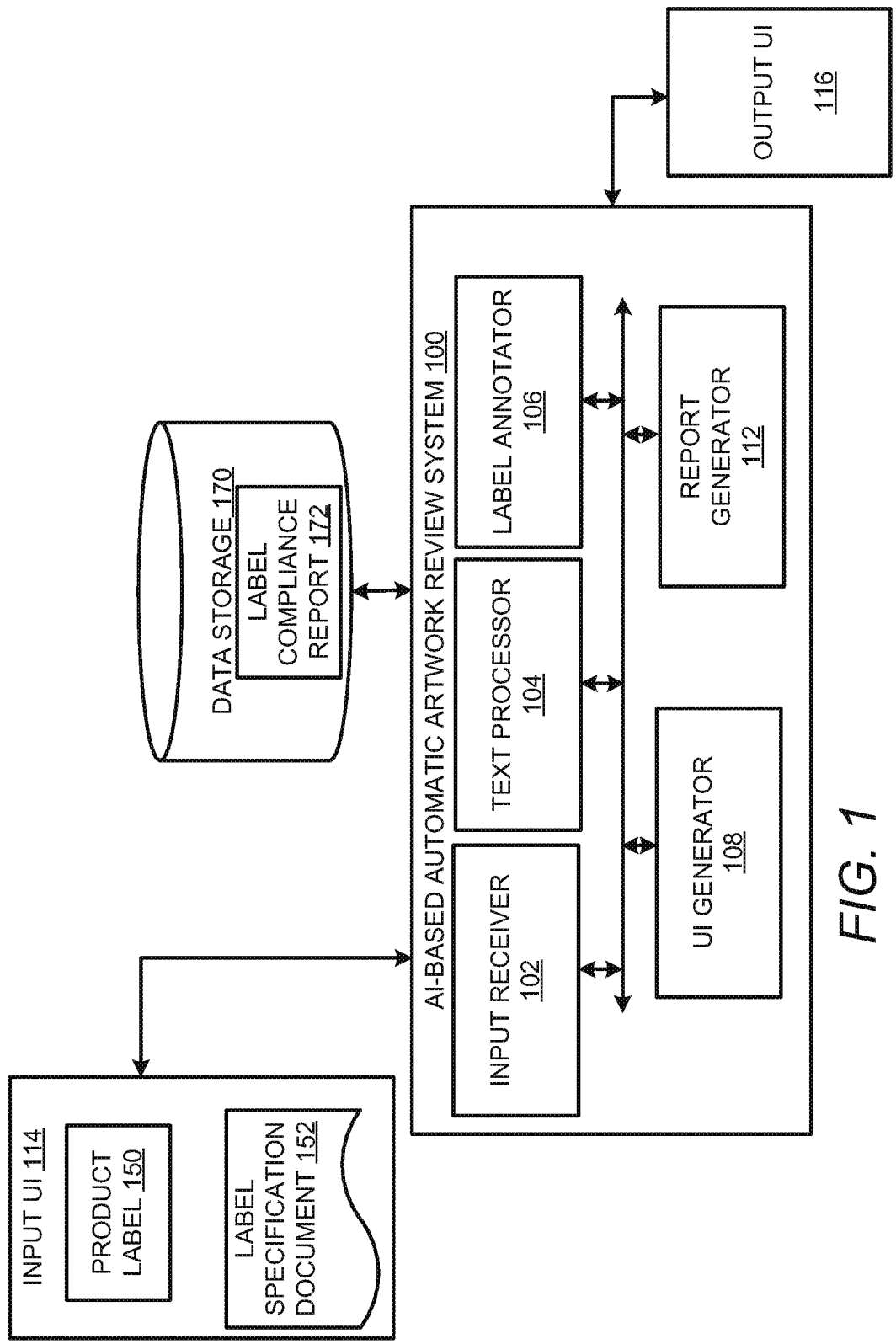
FIG. 1 shows a block diagram of an automatic artwork review system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An automatic artwork review system is disclosed which validates product artwork or product labels based on specifications in the label specification document. The artwork review system receives artwork including the product label and the corresponding label specification document against which the product label is to be validated to ensure that the product label includes all the requisite information in the prescribed manner. The text is initially extracted from the received product label and cleaned to remove extraneous data such as stamps, or unnecessary spaces, etc. The cleaned text from the product label is further chunked into sentence chunks which are further divided into word chunks. It may be appreciated that the sentence chunk as used herein, does not necessarily require a capital letter at the beginning and a period at the ending. Rather, the sentence chunk includes a collection of word chunks separated by predetermined spaces and optionally line breaks, wherein each word chunk is further made up of multiple characters.

The characters are further converted into Unicode and the system compares each of the characters from the word chunks with the characters from the textual content of the label specification document. A score is computed for the characters from the word chunks taking into consideration the trivial equalities, structure, positioning, and distancing. The score is indicative of the extent of matching between the characters from the word chunks and the characters from the label specification document. Based on the efficiency scoring, the best match text is identified from the label specification document for each of the sentence chunks. In an example, the best match text may be a complete sentence beginning with a capital letter and ending with a period. In an example, the best match text may be a collection of words. The similarity between the sentence chunk and the best match text is compared to a predetermined threshold to determine if the best match text is identical to the sentence chunk or if there are one or more differences between sentence chunks and the corresponding best match texts.

In an example, the characters are processed in a linear loop for equality analysis of the characters between the sentence chunks of the product label and the sentences of the label specification document. A distance scoring DIFF is created for each character. A DIFF-patch is converted into a pixel and distance-based list for producing an output string. Two texts can be diffed against each other, generating many patches which will be converted as lists. These patches can then be applied against a third text. If the third text has edits of its own, this version of the patch will apply its changes on a best-effort basis, reporting which patches succeeded and which failed.

If all the sentence chunks of the product label are identical to the corresponding best match texts an output may be generated indicating that the product label complies with the label specification document. If, however, one or more differences are identified between at least one of the sentence chunks and the corresponding best match text, further analysis is executed to identify if differences have occurred due to one or more insertion, replacement, or deletion of characters in the best match text. Furthermore, pixel information of an image of the product label may be accessed, and the pixel locations of the differences are identified on the image of the product label. In an example, semantically meaningful DIFFs can be created from minimal DIFFs. Meaningful diff may be obtained by passing over the data looking for equalities that are smaller than or equal to the insertions and deletions on both sides of the equalities. When such equality is found, it is split into a deletion and addition. Then a second pass is made to reorder and merge all deletions and additions which aren't separated by surviving equalities. Each insertion or deletion which is surrounded on both sides by equalities is located and they are made slide sideways. If the last token of the preceding equality equals the last token of the edit, then the edit may be slide left. Likewise, if the first token of the edit equals the first token of the following equality, then the edit may be slid right. Each of the possible locations can be scored based on either the boundaries appear to be logical.

The output may be generated in multiple formats including an output UI and a label compliance report. The output UI may display the label specification document on one portion or a first side and an image of the product label on an adjacent portion or a second side so that the requirements may be compared with the product label. Furthermore, the output UI can include portions that convey particular best match texts having compliant sentence chunks and best match text for which the corresponding sentence chunks are non-compliant. Natural language processing (NLP) summaries may be further generated to convey if the product label is compliant with the label specification document or if differences exist therebetween.

The automatic artwork review system disclosed herein provides a technical solution to the technical problem of automatically reviewing product labels to determine their compliance with the label specification documents. As mentioned herein, a product label is not only used as a marketing tool but is also used to convey information that may be required by the regulatory regimes in the locations where the products are sold. Depending on the size of the product on which the product label is to be affixed, the font face, the font style, and the font size need to be designed to not only look good but also convey all the requisite information. An average product label, therefore, includes a vast amount of text to be conveyed in a limited space with varying attributes. For example, some information may be conveyed on the product label as a paragraph of textual content while other information may be conveyed as tabular content. Furthermore, attributes of the textual content may vary depending on the requirements. Finally, the product labels may convey the information in different languages. As a result, product labels may not be validated by computers using simple computer vision functions for image analysis or natural language processing (NLP) techniques. The system disclosed herein processes the textual content of the product label as sentence and word chunks and further scores the word chunks character by character to identify even minute differences or deviations in the product label as compared with the label specification document. Also, converting the textual data into Unicode enables the system for increasing the efficiency bit rate and renders the system language agnostic so that product labels in any of the Latin-based languages may be reviewed by the system. The system, therefore, improves existing computer systems with product label review functions in multiple languages so that the errors in the product labels may be automatically identified and conveyed to users visually as well as in a report format.

FIG. 1 shows a block diagram of an automatic artwork review system 100 in accordance with the examples disclosed herein. The system 100 receives as input an artwork that includes a product label 150 and a label specification document 152 and determines if the product label 150 complexes with the label specification document 152. The result of the determination can be provided to the user/reviewer either as a label compliance report 172 or via an output user interface 116. If any errors are detected, the output may include details regarding the errors such as where the errors occurred and what those errors are. The product label 150 includes textual content related to one or more products to which the product label 150 may be affixed. The label specification document 152 includes information regarding the textual content and attributes of the textual content to be employed for validating the textual content and attributes of the textual content of the product label 150. The textual content on the product label may describe components or constituents of the product, usage instructions, warnings, or other regulatory information.

Various types of product labels are used for items such as food products, medicines, electronic goods, clothing, etc., to provide the buyers with information regarding the products. Some products may have multiple labels attached to them with different labels including different information. While some information may be included on the product labels for advertisement purposes, other information may be required to be included by regulations for food products, medicines, etc. Depending on the quantum of information to be included, product labels may be categorized based on complexity as simple, medium complexity, and highly complex. Simple product labels include a lesser number of checkpoints or components to be reviewed with minimum or no regulatory information. Generally, smaller products or labels made for specific parts of products such as bottle lids, etc. may have simple product labels. As the product size increases, product labels tend to become more complex. Medium complexity labels include more information as compared to simple product labels and therefore may have a greater number of checkpoints or components to be reviewed. For example, medium-sized nutritional product containers may have product labels of medium complexity. Highly complex product labels are generally produced for multipacks or special combo offers that may include information about all the multiple units included in the multipack. The regulatory information to be included would be multi-fold as it needs to be repeated for each unit in the multipack. Accordingly, the checkpoints or information components to be validated will increase proportionately, and therefore, the reviewer may be referred to multiple label specification documents or product labels reports (PLR) to proofread and validate such highly complex product labels thereby giving rise to a higher probability of errors owing to human oversight.

The system 100 includes an input receiver 102, a text processor 104, a label annotator 106, a UI generator 108 which may generate an input UI 114 and an output UI 116, and a report generator 112. The system 100 can receive the product label 150 and the label specification document 152 via the input UIs 114 as a user uploads. In an example, the system 100 may automatically access the product label 150 and the label specification document 152 from a storage device e.g., the data storage 170, which is communicatively coupled to the system 100. Alternatively, the system 100 may receive the product label 150, the label specification document 152 via an email, etc. In an example, the product label 150, the label specification document 152 may be received in the same format such as portable document format (.pdf). In an example, the product label 150, the label specification document 152 may be received in different formats. By way of illustration and not limitation, the product label 150 can be received in an image format, while label specification document 152 can be received in a pdf, or document (.doc) format. In addition to the actual textual content to be evaluated on the product label 150, the label specification document 152 includes attributes of the textual content, such as font size, font style, positioning, or arrangement of the textual content within the product label 150, etc.

The product label 150 and the label specification document 152 are provided to the text processor 104 which extracts the textual content from the product label 150 and the label specification document 152. The textual content may include content in different languages based on the Latin alphabet, such as English, French Italian, Portuguese, Spanish, Romanian, German, Dutch, Norwegian, Danish, etc. In order to operate in a language-agnostic manner, the textual content is converted into Unicode characters by the text processor 104. In addition, the attributes of metadata of the textual content, such as the position coordinates of the textual content within the product label 150, the position of specific words within the textual content, the font size, etc., are also extracted by the text processor 104. The Unicode characters along with the attributes of the textual content are provided to the label annotator 106 which compares the textual content from the product label 150 with the textual content of the product specifications document 152. In addition, the label annotator 106 identifies the specific errors or differences and positions of the errors in the textual content of the product label as compared to the textual content of the product specifications document 152. The errors identified by the label annotator 106 are provided to one or more of the UI generator 108 and the report generator 112 for communication to the user. The report generator 112 can be configured to generate a label compliance report 172 using NLP techniques to generate a summary of the errors. An output UI can display the label specification document 152 and an image of the product label 150 with the errors highlighted or annotated thereon.

Figure 2:
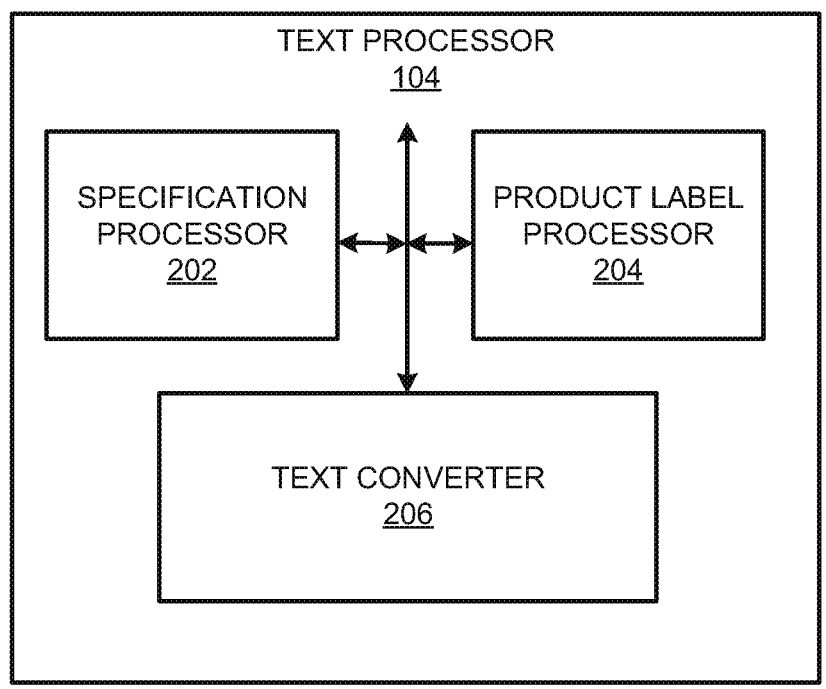
FIG. 2 shows a block diagram of a text processor in accordance with the examples disclosed herein.

FIG. 2 shows a block diagram of the text processor 104 in accordance with the examples disclosed herein. The text processor 104 includes a specifications document processor 202, a product label processor 204, and a text converter 206. The specifications document processor 202 extracts the textual content of the label specifications document 152. In an example, the label specifications document 152 can be searchable, and therefore, tools such as libraries with text extraction functions can be employed by the specifications document processor 202. In addition to the actual textual content, the label specification document 152 can also include textual content attributes such as pixel positions of specific words in the product label 150, the font size, the font style, etc. The product label 150 may be generally received as an image and hence the product label processor 204 employs image text extraction techniques to extract and process textual content of the product label 150. In an example, the product label processor 204 may employ OpenCV functions to extract text from the product label 150. The extracted text may need to be further processed before it can be validated. This is because the product label 150 may include overlapping text such as stamps, text that is oriented vertically or diagonally, or text with non-uniform spaces, etc. Hence, the product label processor 204 further executes a cleanup of the textual content extracted from the product label 150.

In an example, the overlapping text, the text which is oriented vertically or diagonally, or text with non-uniform spaces may be deleted. In an example, overlapping text or text superimposed on underlying print on the product label i.e., date stamps, etc. may be removed. For example, in a single letter overlap, search for that letter in the second string. If the search is succeeded then the substrings are identified for emasing the equality. Then indexOf function may be used to locate any instance of the substring and one character. This process may be repeated until no matches are found and the last confirmed substring match is identified as the overlapping text to be deleted. The text which is thus processed is provided to the text converter 206 for conversion into Unicode formats making the system 100, language-agnostic so that labels of multiple languages may be processed for validation.

Figure 3:
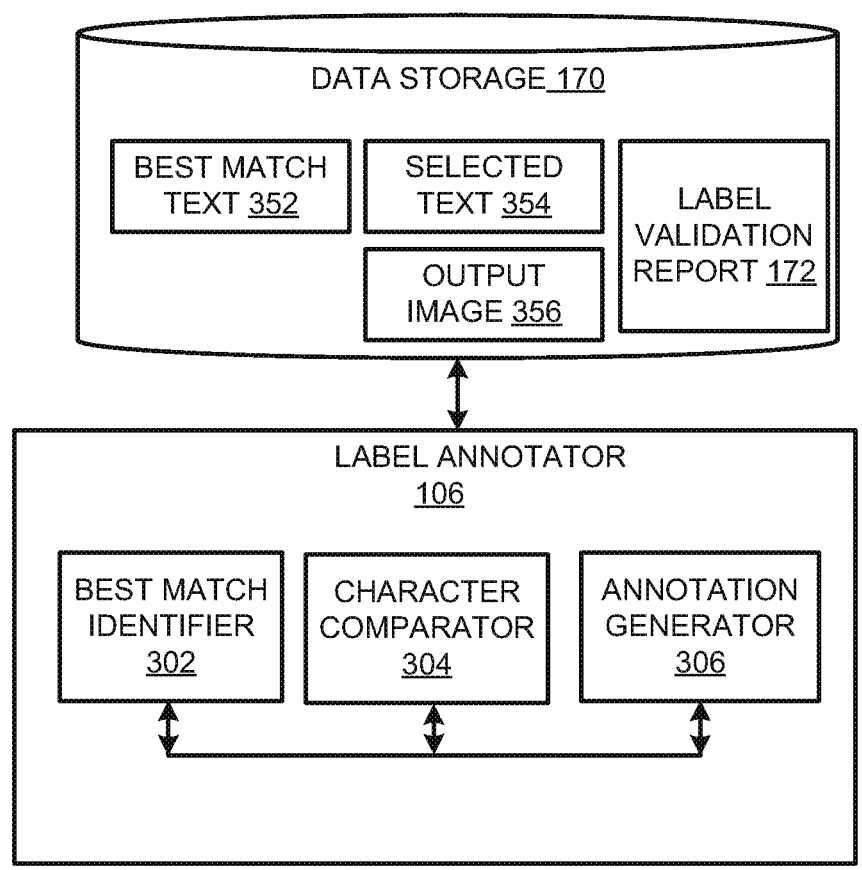
FIG. 3 shows a block diagram of a label annotator in accordance with the examples disclosed herein.

FIG. 3 shows a block diagram of the label annotator 106 in accordance with the examples disclosed herein. The label annotator 106 includes a best match identifier 302, a character comparator 304, and an annotation generator 306. The best match identifier 302 breaks up a selected portion of the textual content extracted from the product label 150 i.e., a selected text 354 into ordered chunks. In an example, the different factors may be identified from the Unicode format and a character such as a line break can be identified so that a group of words between two line breaks may form an ordered chunk, namely a sentence chunk. Each sentence chunk may be further broken up into word chunks using the spaces between the words of the sentence chunk. Each word chunk obtained from the sentence chunks of the product label 150 is further analyzed in a character-by-character comparison for efficiency scoring with the textual content of the label specification document 152. For each word chunk comparison with a word of the label specification document 152, an efficiency score may be obtained as:

$$O*C+N \qquad \text{Eq. (1)}$$

where 'O' is the number of edit operations to be executed on the word chunk to be made equivalent to a given word, 'C' is the constant cost of each edit operation in terms of characters, and 'N' is the total number of characters that are changed.

Based on the scoring, the best match sentence or best match text 352 can be identified as the words/phrases with a minimum score for a selected text 354 from the textual content of the product label 150. In an example of the selected text may contain one or more sentence chunks.

The best match texts may be identical to each of the corresponding sentence chunks from the product label so that no errors are raised in the validation. The label annotator 106, therefore, provides an output that image of the product label 150 that was received as input to the output UI 116 without any annotations and including a message that the product label 150 is fully compliant with the label specification document 152. The label compliance report 172 may be similarly generated by report generator 112.

If the score of the characters of the selected text 354 indicates that the best match text 352 is not identical to the selected text 354, the selected text 354 and the best match text are provided to the character comparator 304 to identify where and which of the characters are different. The differences can include omission of one or more characters, inclusion of one or more additional characters, and/or replacement of the correct characters as given in the best match text 352 with other characters in the selected text 354. The output from the character comparator 304, therefore, includes the erroneous character positions or the erroneous characters in the selected text 354. The output from the character comparator 304 is provided to the annotation generator 306 which generates a pixel and distance-based list of the character comparator output. In an example, the annotation generator 306 can generate an output image 356 which includes an annotated image of the product label 150 with the character comparator output highlighted. In an example, the character comparator output may also be provided to the report generator 112 which employs NLP techniques to generate a human-readable report i.e., the label compliance report 172 that interprets the character comparator output.

Figure 4:
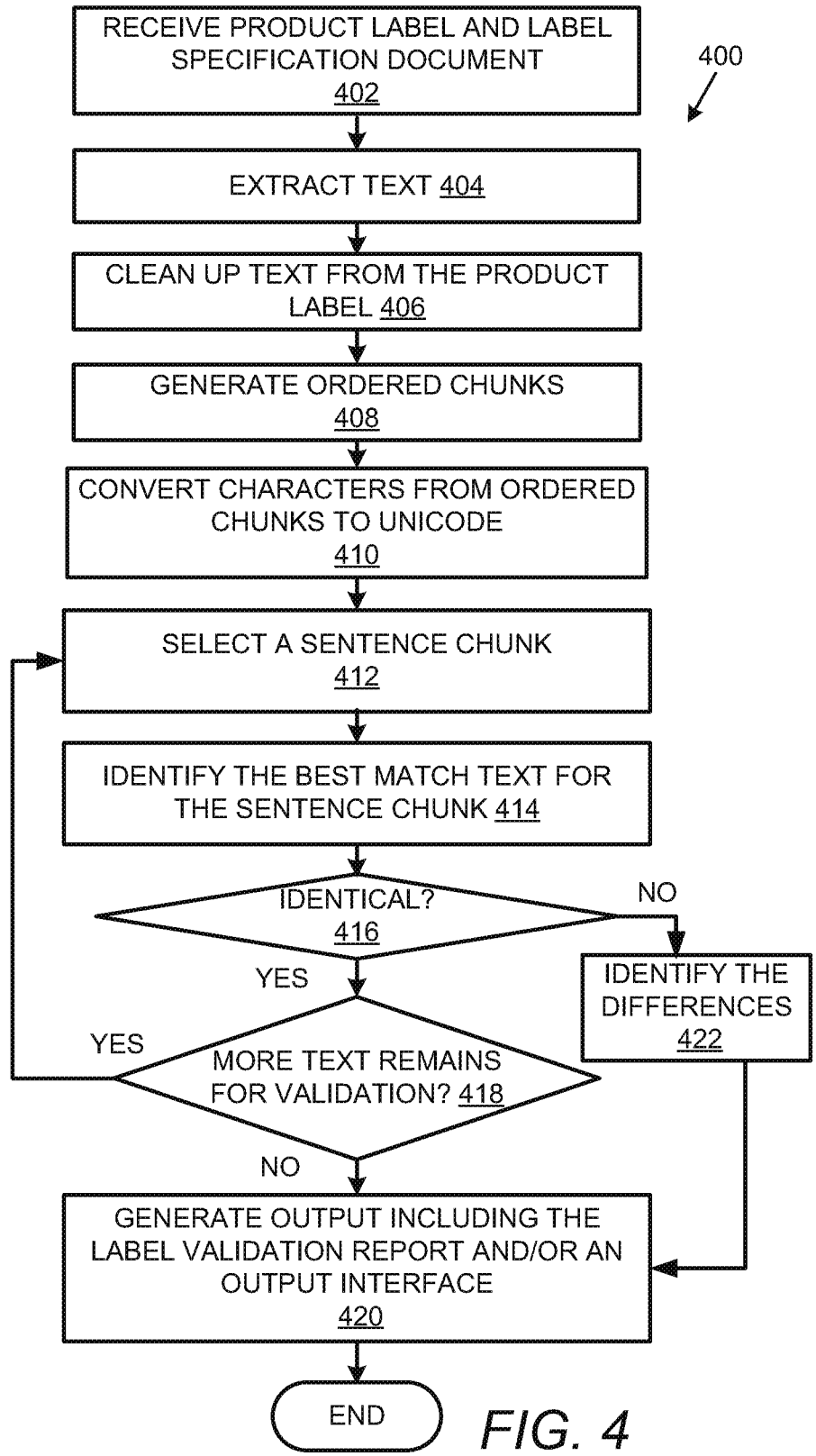
FIG. 4 shows a flowchart that details a method of validating a product label in accordance with the examples disclosed herein.

FIG. 4 shows a flowchart 400 that details a method of validating the product label 150 in accordance with the examples disclosed herein. The method begins at 402 wherein the product label 150 and the label specification document 152 are received. At 404 text is extracted from the product label 150 and the label specification document 152. In an example, the libraries of functions such as but not limited to PyPDF2 and PDFMiner can be employed at 404 the text extraction depending on the formats of the received documents. If the product label 150 is received as an image, then Artificial Intelligence (AI)-based tools such as OpenCV may be employed for the text extraction from the image. At 406, a cleanup process is executed on the text extracted from the product label 150. This is because the product label text may be unstructured text with overlapping characters, characters, or word chunks divided by non-uniform spaces, or text which is oriented in different directions e.g., vertically, diagonally, etc. Accordingly, the overlapping text, the text which is oriented in non-horizontal directions, and/or the nonuniform text can be discarded during the cleanup process. If the text oriented in the non-horizontal direction needs to be extracted, then a rotated image of the product label 150 may so that the text is oriented horizontally for extraction.

At 408, ordered chunks are generated. For example, space or line break characters may be employed to generate sentence chunks which are further split into word chunks. The characters of the word chunks are converted into Unicode at 410. At 412, a sentence chunk is selected and at 414 the longest common subsequence or the best match text 352 is identified from the textual content of the label specification document 152 for the selected text 354 from the product label 150. At 416, it is determined if the selected text 354 is identical to the best match text 352 or if the match percentage of the selected text 354 and the best match text 352 is 100%. If yes, the method moves to 418 to determine if further text remains for validation processing from the product label 150. If further text remains for validation processing, the method returns to 412 to select the next sentence chunk. If no further text from the product label 150 remains for validation processing, the method moves to 420 to generate the output.

If it is determined at 416 that the selected text 354 is not identical to the best match text 352, the method moves to 422 to identify the differences between the selected text 354 and the best match text 352 by executing comparisons therebetween. The differences between the selected text 354 and the best match text 352 are recorded at 418. The differences may be recorded in different formats. For example, the differences may be annotated on an image of the product label 150 by highlighting the portions or positions where the selected text 354 differs from the best match text 352. In an example, the differences may be summarized using NLP in the label compliance report 172. The differences thus recorded are provided as output at 420.

Figure 5:
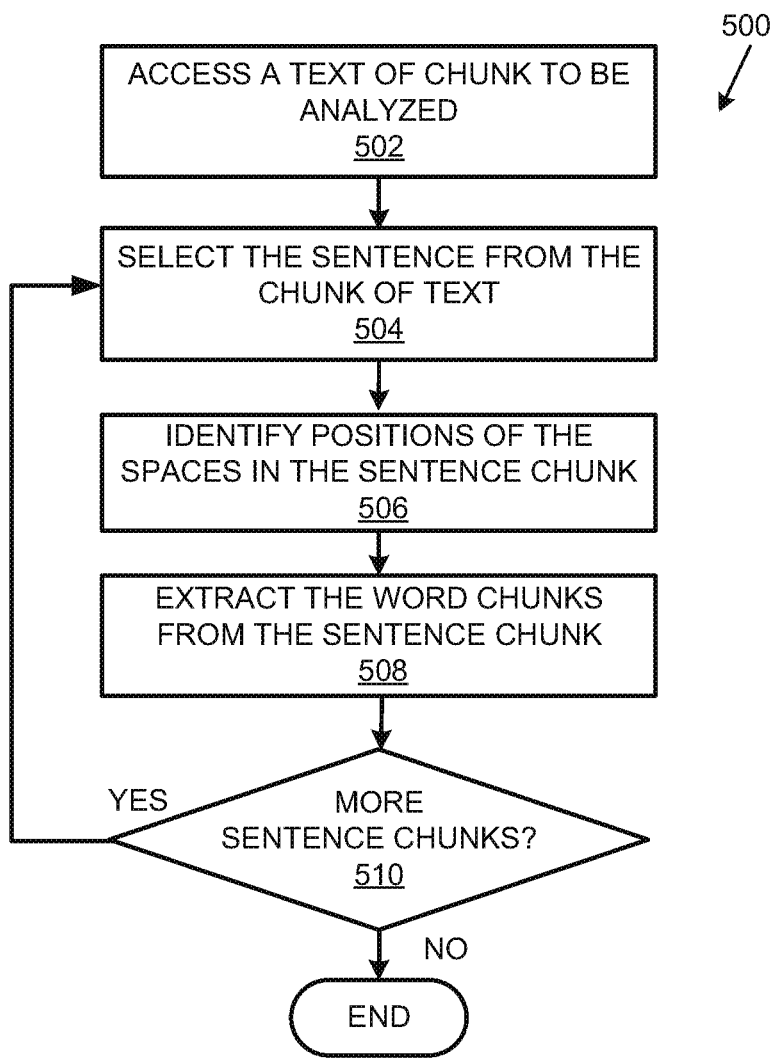
FIG. 5 shows a flowchart that details a method of generating ordered chunks in accordance with the examples disclosed herein.

FIG. 5 shows a flowchart 500 that details a method of generating ordered chunks in accordance with the examples disclosed herein. The method begins at 502 wherein a chunk of text to be analyzed is accessed. The chunk of text may contain multiple sentence chunks. At 504, a sentence is selected based on analysis of pixel positions and/or the Unicode characters in the chunks of text. For example, a space character, a period, or a line break character may be used to identify the beginning/end of the sentence chunk. Accordingly, the first sentence chunk of the chunk of text may be selected at 504 at the beginning of the text chunking process. The positions of the spaces in the sentence chunk are identified at 506. The word chunks are extracted at 508 based on the positions of the space characters in the sentence chunk. At 510 it is determined if further sentence chunks remain to be processed. If yes, the method returns to 504 to select the next sentence chunk else the method terminates on the end block.

Figure 6:
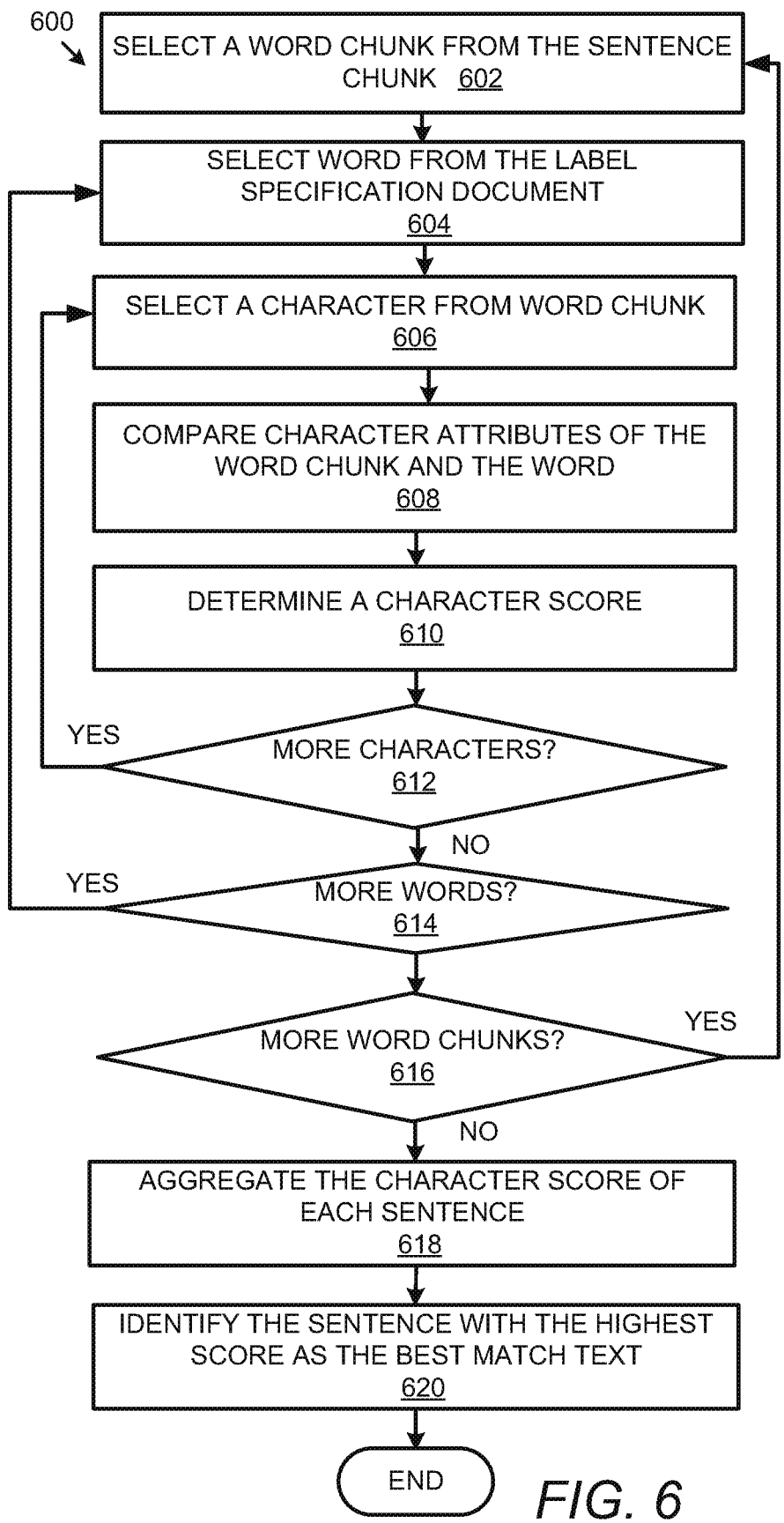
FIG. 6 shows a flowchart that details a method of identifying the best match text in accordance with the examples disclosed herein.

FIG. 6 shows a flowchart 600 that details a method of identifying the best match text in accordance with the examples disclosed herein. At 602, a word chunk is selected from a sentence chunk i.e., the selected text 354 for which the best match text 352 is to be identified from the textual content of the label specification document 152. The word chunk is compared to each word of a selected sentence from the label specification document 152 and accordingly, a word is selected from the sentence at 604. At 606, a character is selected from the word chunk. At 608, attributes of the selected character are compared to attributes of another character selected from the word. The characters may be compared in order so that a character from the word chunk is compared to each character of the word in order. The character attributes that are compared can include but are not limited to the structure of the character, the distance of the character, and the position of the character in the word chunk/word. A character score is determined at 610 for the characters extracted from the word chunk. In an example, the character score can be obtained via efficiency scoring as detailed herein. In an example, the character score can be obtained based on the similarity of that character and character attributes with the corresponding character and character attributes of the word. In an example, the character score may be a cumulative score of the character under each of the character attributes for which the data is compared. At 612, it is determined if more characters remain in the word chunk for comparison. If yes, the method returns to 606 to select the next character from the word chunk.

If it is determined at 612 that no further characters remain from the word chunk for comparison, the method moves to 614 to determine if there are more words from the textual content of the label specification document 152 to be compared with the selected word chunk. If at 614 it is determined that more words remain to be compared with the selected word chunk, the method moves to 604 to select the next word. In an example, the characters may be processed in a linear loop to find an equality analysis of characters between the sentences. In an example, a distance scoring DIFF may be created for each character. A fuzzy match may be implemented so that a match can be identified even if the pattern contains errors and does not exactly match the word chunk. This may be computed based on the number of differences between the pattern and the text and the distance between the match and the expected location. The match distance parameter sets the relative importance of these two metrics.

If at 614, it is determined that no more words remain to be compared with the selected word chunk, the method moves to 616 to determine if more word chunks are to be scored. If yes, the method moves to 602 to select the next word chunk. If at 616 it is determined that no more word chunks remain to be processed, the method moves to 618 to aggregate the scores of the sentence chunk with each of the sentences of the label specification document. At 620, a sentence from the label specification document 152 with the highest matching score is selected as the best match text 352 for the sentence chunk.

Figure 7:
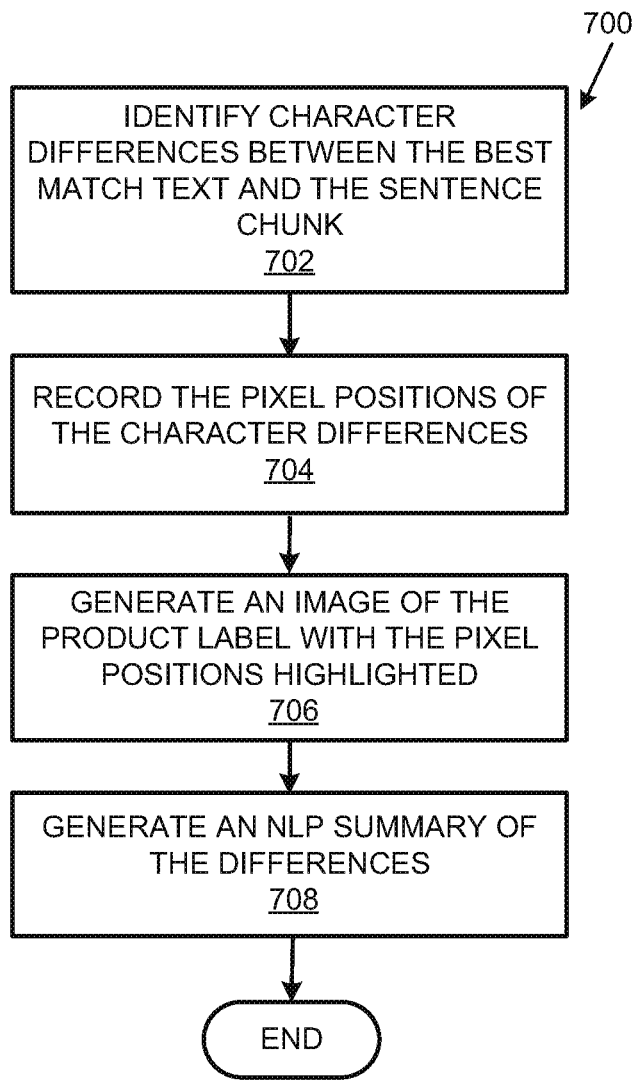
FIG. 7 shows a flowchart that details a method of providing output in accordance with the examples disclosed herein.

FIG. 7 shows a flowchart 700 that details a method of providing output in accordance with the examples disclosed herein. The method begins at 702 wherein the character differences are identified between the best match text and the sentence chunk. In an example, each character of the sentence chunk can be compared to the corresponding character of the best match text and mismatching characters may be identified based on the Unicode comparisons. In an example, the mismatches may occur due to one or more of insertion of additional characters, deletion of characters, or replacement of characters in the word chunks as compared to the corresponding words from the label specification document 152. At 704, a pixelated image of the product label 150 is accessED, and the pixel positions of the character differences are identified and recorded for the product label 150. The differences can be output in different forms based on the user preferences for the system 100. For example, if the user employs the output UI 116, an image of the product label 150 with the pixel positions highlighted may be generated at 706. However, if the user opts to receive the differences as a report, an NLP summary of the differences can be generated at 708 and provided via one or more of the output UI 116 and the label compliance report 172.

Figure 8:
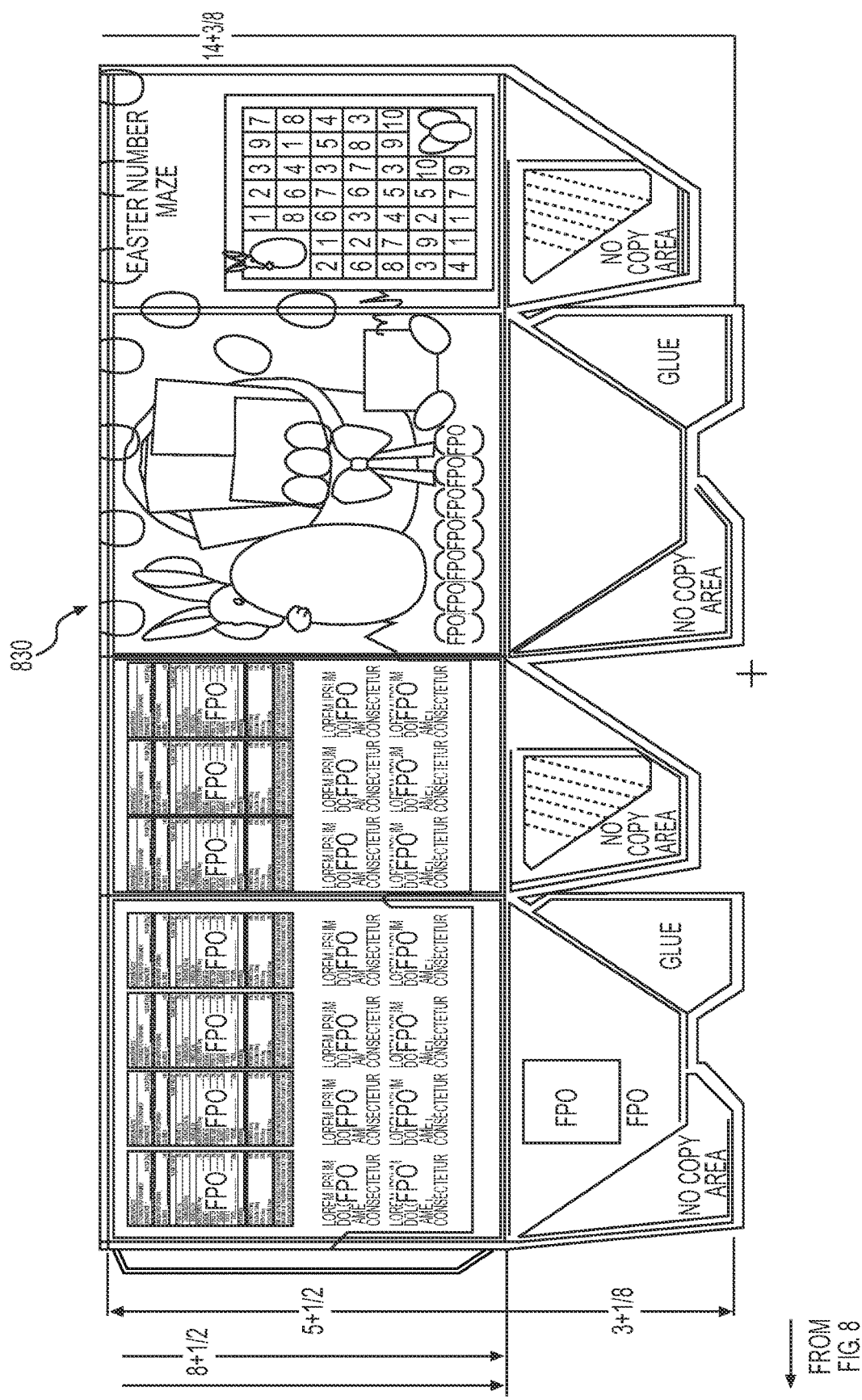
FIG. 8 shows some example product labels that can be validated in accordance with the examples disclosed herein.

FIG. 8 shows some example product labels that can be validated in accordance with the examples disclosed herein. A simple product label 802 may have a small number of items to be validated. For example, the simple product label 802 includes a nutritional information field 804, a category field 806, a brand-name field 808, an advertising tag field 812, and an item code field 814. These fields constitute unstructured data and may be oriented in different directions. For example, the item code field 814 is oriented diagonally while the other fields are oriented horizontally. A medium-complexity product label 820 may include multiple lines of information along with one or more tables, with the text of different data types, e.g., string data, numeric data such as numbers on a bar code label, dates, currencies, addresses, font sizes, font faces, and even different types, e.g., typed text or product stamps, etc. Hence, these labels are more complex and require more time for validation. A highly complex label 830 includes numerous fields which may pertain to one or more products of different fonts arranged in different data structure formats and different orientations. For example, the highly complex label 830 is designed for a multipack and hence may include multiple copies of the same information associated with each unit of the multipack.

Figure 9:
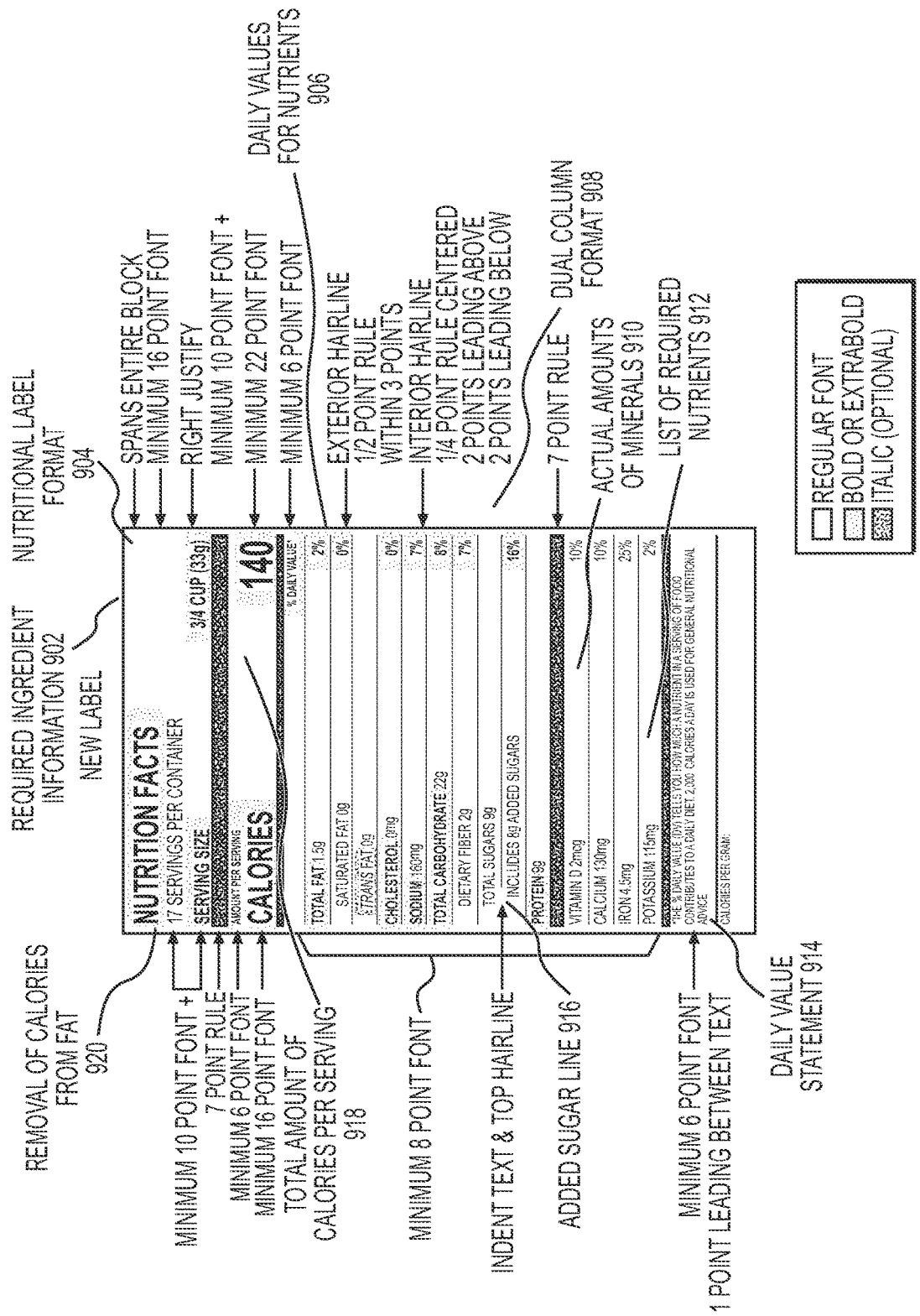
FIG. 9 shows example label data and metadata that is validated by the artwork review system in accordance with the examples disclosed herein.

FIG. 9 shows example label data and metadata that is validated by the system 100 in accordance with the examples disclosed herein. The system 100 can be configured to detect not only the specifics of various fields associated with the nutritional information but also the presentation format (i.e., the metadata). For example, the required ingredient information 902 field may need to be gathered from the suppliers for verification. Similarly, various product label fields that are verified for a simple product label are described herein for illustration purposes only. The nutritional label format 904 may need to be verified per the label specification document 152 including the font size, the font type, the font style, the text positioning including centering, etc. Similarly, the daily values for nutrients 906, the dual column format 908, the actual amounts of minerals/nutrients 910, the list of required nutrients 912 including Vitamin D, Potassium, Calcium and Iron, Daily value statement 914, the Added Sugar line 916, perform calculations to validate calculated values such as the total amount of calories per serving 918 and check for removal of Calories from Fat 920. Additionally, the system 100 can be further configured to validate the various format requirements described for each of the fields.

Figure 10:
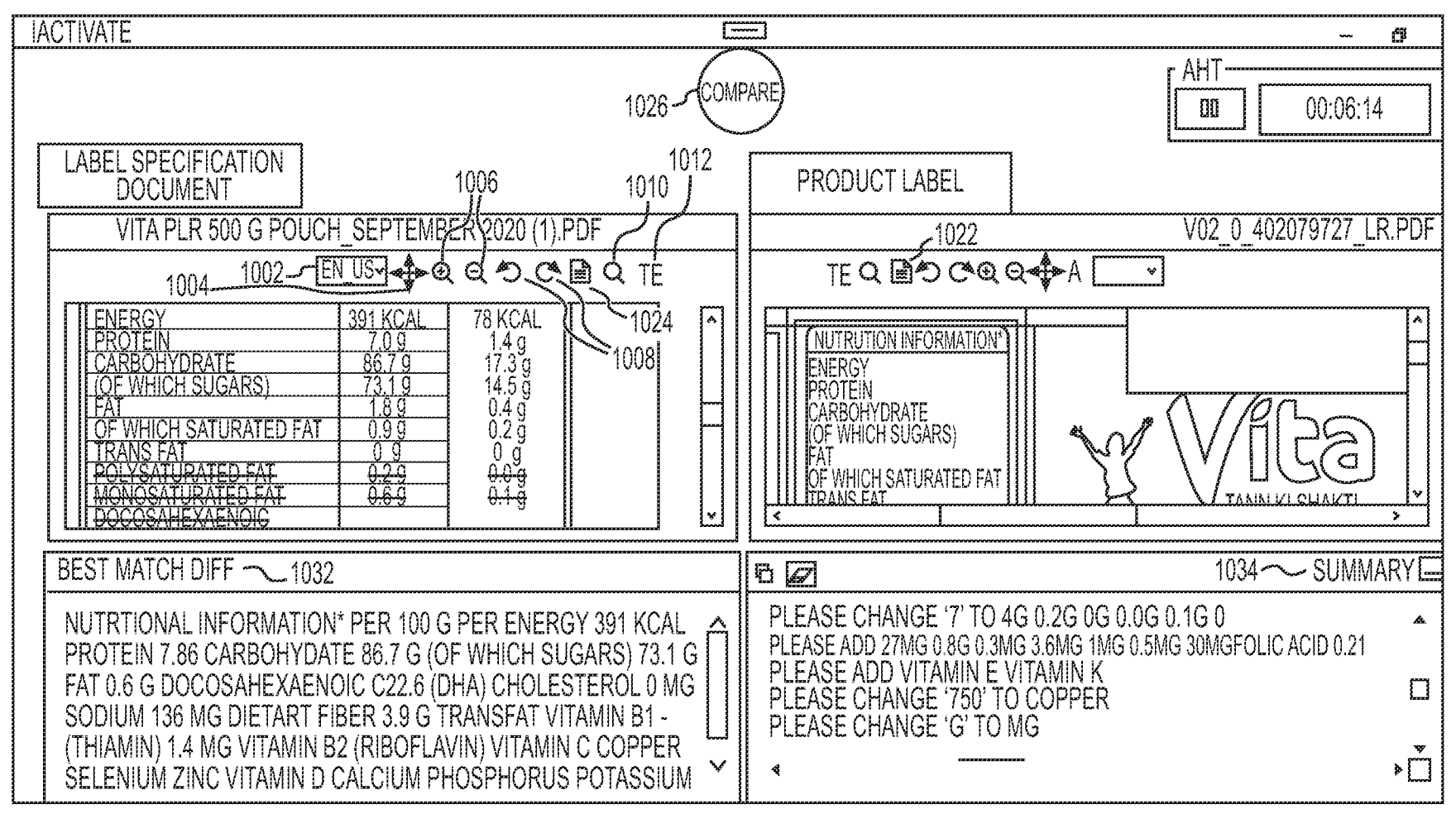

FIG. 10 shows an example output UI 1000 generated by the system 100 for displaying comparisons between the product label 150 and the label specification document 152 in accordance with the examples disclosed herein. The artwork or the product label 150 is displayed on the right side whereas the label specification document 152 is displayed on the left side of the output UI 1000. The output UI 1000 provides a variety of UI elements that enable user interaction with the displayed content. The UI elements on the left side used for interacting with the label specification document 152 may include but are not limited to, the language selection button 1002, the PAN space feature 1004, the zoom in/zoom out button 1006, the rotation buttons 1008, the search button 1010, and the text editor 1012. The language selection button 1002 may be used to identify the language of the product label 150 and the label specification document 152 to the system 100. Additionally, upload buttons 1022 and 1024 enable uploading the product label 150 and the label specification document 152 respectively for display in the corresponding portions of the output UI 1000. In addition to the aforementioned UI elements, the right side also includes a timer that maintains the time taken for executing a validation task.

On uploading the product label 150 and the label specification document 152 the user may click the compare button 1026 to begin the comparison of the uploaded material. The difference between the documents is displayed at the bottom portion of the output UI 1000. The differences between the best match text and the corresponding selected text of the product label are highlighted as shown on the left side in a best match display portion 1032 which shows a part of the label specification document 152 with the best match text, while a summary display portion 1034 shows a summary of the changes to be affected to the product label 150 to make the product label 150 compliant with the best match text displayed on the left side. The summary of the changes shown in the summary display portion 1034 is generated from the NLP components is shown on the right side. Furthermore, the output UI 1000 can be configured so that clicking on any one of the product label image on the right side or the label specification document display on the left side may automatically scroll to the corresponding portion on the left/right side of the UI. For example, clicking on a tabular form in the label specification document 152 on the left side may automatically cause a display of the tabular form in the product label 150 on the right side. This is because a record of the pixel positions of the fields is maintained by the system 100 and the output UI 1000 can be configured to identify the portions of the display receiving the click events so that the corresponding portion of the label specification document or product label image can be displayed on the adjacent side.

Figure 11:
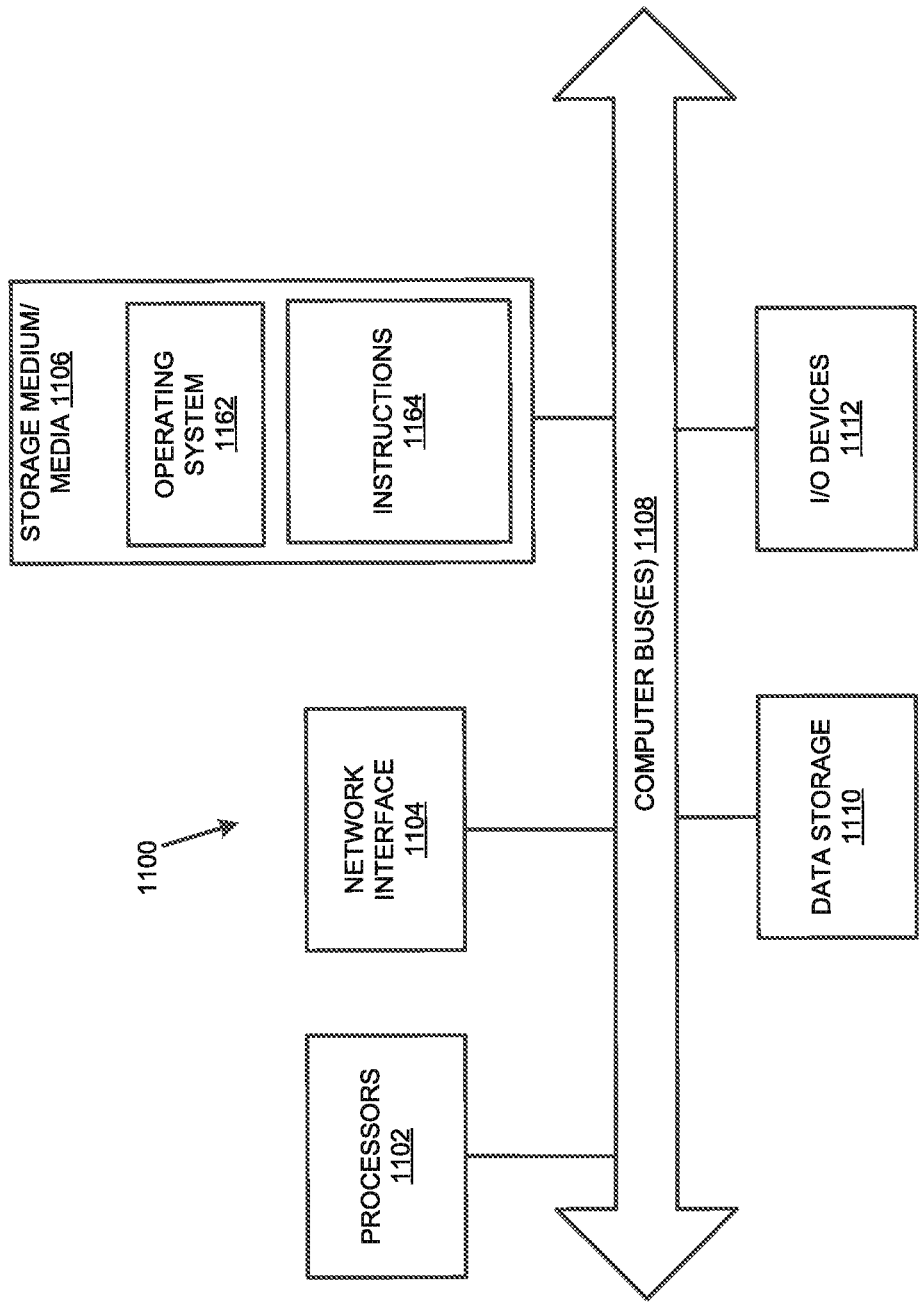
FIG. 11 illustrates a computer system that may be used to implement the automatic artwork review system in accordance with the examples disclosed herein.

FIG. 11 illustrates a computer system 1100 that may be used to implement the automatic artwork review system 100. More particularly, computing machines such as desktops, laptops, smartphones, tablets, and wearables which may be used to generate or access the data from the automatic artwork review system 100 may have the structure of the computer system 1100. The computer system 1100 may include additional components not shown and that some of the process components described may be removed and/or modified. In another example, a computer system 1100 can sit on external-cloud platforms such as Amazon Web Services, AZURE® cloud or internal corporate cloud computing clusters, or organizational computing resources, etc.

The computer system 1100 includes processor(s) 1102, such as a central processing unit, ASIC or another type of processing circuit, input/output devices 1112, such as a display, mouse keyboard, etc., a network interface 1104, such as a Local Area Network (LAN), a wireless 802.11x LAN, a 3G, 4G or 5G mobile WAN or a WiMax WAN, and a processor-readable medium 1106. Each of these components may be operatively coupled to a bus 1108. The computer-readable medium 1106 may be any suitable medium that participates in providing instructions to the processor(s) 1102 for execution. For example, the processor-readable medium 1106 may be a non-transitory or non-volatile medium, such as a magnetic disk or solid-state non-volatile memory, or a volatile medium such as RAM. The instructions or modules stored on the processor-readable medium 1106 may include machine-readable instructions 1164 executed by the processor(s) 1102 that cause the processor(s) 1102 to perform the methods and functions of the automatic artwork review system 100.

The automatic artwork review system 100 may be implemented as software or machine-readable instructions stored on a non-transitory processor-readable medium and executed by one or more processors 1102. For example, the processor-readable medium 1106 may store an operating system 1162, such as MAC OS, MS WINDOWS, UNIX, or LINUX, and code 1164 for the automatic artwork review system 100. The operating system 1162 may be multi-user, multiprocessing, multitasking, multithreading, real-time, and the like. For example, during runtime, the operating system 1162 is running and the code for the automatic artwork review system 100 is executed by the processor(s) 1102.

The computer system 1100 may include a data storage 1110, which may include non-volatile data storage. The data storage 1110 stores any data used by the automatic artwork review system 100. The data storage 1110 may be used to store the product label 150, the label specification document 152, the label compliance report 172, or other data elements, which are generated and/or used during the operation of the automatic artwork review system 100.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An automatic artwork review system, comprising:
at least one processor;
a non-transitory processor-readable medium storing machine-readable instructions that cause the processor to:
receive a label specification document and a product label, the label specification document including textual content and attributes of the textual content to be used for validating textual content on the product label;
break up the textual content of the product label into sentence chunks and word chunks;
convert characters of the textual content of the product label and characters of the textual content of the label specification document into Unicode characters;
score the characters and character attributes from the word chunks based on similarities with the characters and character attributes from the textual content of the label specification document;
identify from the textual content of the label specification document, a best match text for the sentence chunks based on the scores of the characters of the word chunks;
determine if the scores of the characters of the sentence chunks indicate match percentages higher than a predetermined threshold with corresponding best match texts from the textual content of the label specification document;
identify one or more of the sentence chunks having the match percentages with the corresponding best match texts less than the predetermined threshold;
identify for the sentence chunks having the match percentages less than the predetermined threshold, one or more characters in the sentence chunks that differ from corresponding characters of the corresponding best match texts; and
provide an output that informs a user of the one or more characters in the sentence chunks that differ from characters of the corresponding best match texts.

2. The artwork review system of claim 1, wherein the processor is to further:
disregard from further processing, the sentence chunks with the match percentages higher than the predetermined threshold; and
provide the output that the sentence chunks with the match percentages higher than the predetermined threshold are compliant with the label specification document.

3. The artwork review system of claim 1, wherein to provide the output the processor is to further:
enable displaying on an output user interface (UI), an image of the product label with the one or more characters highlighted for at least one of the sentence chunks.

4. The artwork review system of claim 3, wherein to provide the output the processor is to further:
enable providing on a first side of the output UI, the label specification document that includes the best match text for the at least one sentence chunk including the one or more characters and a portion of the image of the product label including the at least one sentence chunk with the one or more characters on a second side of the output UI.

5. The artwork review system of claim 4, wherein the second side is adjacent to the first side.

6. The artwork review system of claim 4, further comprising:
providing a best match display portion and a summary display portion in the output UI, wherein the best match display portion displays the best match texts identified from the label specification document displayed on the first side while the summary display portion displays a summary of changes to be made to the product label to make the product label compliant with the label specification document.

7. The artwork review system of claim 1, wherein to identify the characters in the sentence chunks that differ from corresponding characters of the best match texts the processor is to further:
identify additional characters included in one or more of the sentence chunks of the product label and corresponding ones of the best match texts from the label specification document.

8. The artwork review system of claim 1, wherein to identify the characters in the sentence chunks that differ from corresponding characters of the best match texts the processor is to further:
identify at least one of the characters in one of the sentence chunks that is different from one of the corresponding characters in one of the best match texts.

9. The artwork review system of claim 1, wherein to provide the output for each of the sentence chunks having match percentages less than the predetermined threshold the processor is to further:
generate a human-readable summary of differences between the sentence chunks and corresponding ones of the best match texts by employing natural language processing (NLP).

10. The artwork review system of claim 1, wherein to extract the textual content from the product label the processor is to further:
remove overlapping text from the textual content of the product label.

11. The artwork review system of claim 1, wherein to extract the textual content from the product label the processor is to further:
remove from consideration a portion of the textual content of the product label that is oriented in a non-horizontal direction.

12. The artwork review system of claim 1, wherein to extract the textual content from the product label the processor is to further:
remove from consideration a portion of the textual content of the product label wherein the word chunks are divided by non-uniform spaces.

13. The artwork review system of claim 12, wherein to identify the sentence chunks having the match percentages less than the predetermined threshold the processor is to further:
extract the characters and attributes of the characters from the sentence chunks, wherein the character attributes for each of the characters include a structure, a position, and a distance of the character from a beginning of a corresponding one of the sentence chunks.

14. A method of reviewing a product label for compliance, comprising:
extracting textual content from the product label, wherein the textual content from the product label is to be compared to textual content from a label specification document;
generating sentence chunks including one or more words chunks from the textual content extracted from the product label;
converting characters in the word chunks and characters from the textual content of the label specification document into Unicode characters;
score the characters and attributes of the characters of the word chunks based on a comparison with the characters of the label specification document and attributes of the characters of the label specification document;
identifying a best match text from the textual content of the label specification document for each of the sentence chunks based on the scores of the characters of the word chunks;
identifying one or more of the sentence chunks with the scores below a predetermined threshold;
execute a character-wise comparison between each of the sentence chunks with the scores below the predetermined threshold and corresponding ones of the best match texts;
identifying for each of the word chunks, one or more of the characters in the word chunks that are different from the characters of a corresponding one of the best match texts;
determining if one of a replacement, an insertion, or a deletion operations is to be executed for each of the one or more characters in the word chunks that are different from the characters of the corresponding ones of the best match texts; and
enabling generation of an output that includes annotations of the one or more characters in the word chunks subject to one of the replacement, insertion, or deletion operations.

15. The method of claim 14, further comprising:
identifying on a pixelated version of the product label, pixel positions of each of the one or more characters in the word chunks that are different from the characters of the corresponding ones of the best match texts.

16. The method of claim 15, wherein enabling the generation of the output further comprises:
enabling the generation of an output user interface (UI) that displays an image of the product label with the pixel positions highlighted.

17. The method of claim 15, wherein enabling the generation of the output further comprises:
generating a label validation report that includes a natural language processing (NLP) summary in a human-readable format of the one or more characters in the word chunks that are different from the characters of the corresponding ones of the best match texts.

18. A non-transitory processor-readable storage medium comprising machine-readable instructions that cause a processor to:
receive a label specification document and a product label, the label specification document including textual content and attributes of the textual content to be used for validating textual content on the product label;
break up the textual content of the product label into sentence chunks and word chunks;
score characters and character attributes from the word chunks based on similarities with characters and character attributes from the textual content of the label specification document;
identify from the textual content of the label specification document a best match text for the sentence chunks based on the scores of the characters;

determine if the scores of the characters of the sentence chunks indicate a match percentage higher than a predetermined threshold with corresponding sentences from the textual content of the label specification document;

identify one or more of the sentence chunks have match percentages less than the predetermined threshold;

identify for the sentence chunks having the match percentages less than the predetermined threshold, one or more characters in the sentence chunks that differ from corresponding characters of the best match texts; and provide an output that informs a user of the one or more characters in the sentence chunks that differ from the corresponding characters of the best match texts.

19. The non-transitory processor-readable storage medium of claim 18, comprising further instructions that cause the processor to:

identify on a pixelated version of the product label, pixel positions of characters in the word chunks that are different from characters of corresponding words of the best match texts.

20. The non-transitory processor-readable storage medium of claim 19, wherein the differences are caused due to one of a replacement of the characters, an insertion of the characters, or a deletion of the characters on the word chunks.

* * * * *